Feb. 6, 1945.   R. WEHR   2,368,956
ROTARY VALVE
Filed Feb. 6, 1943
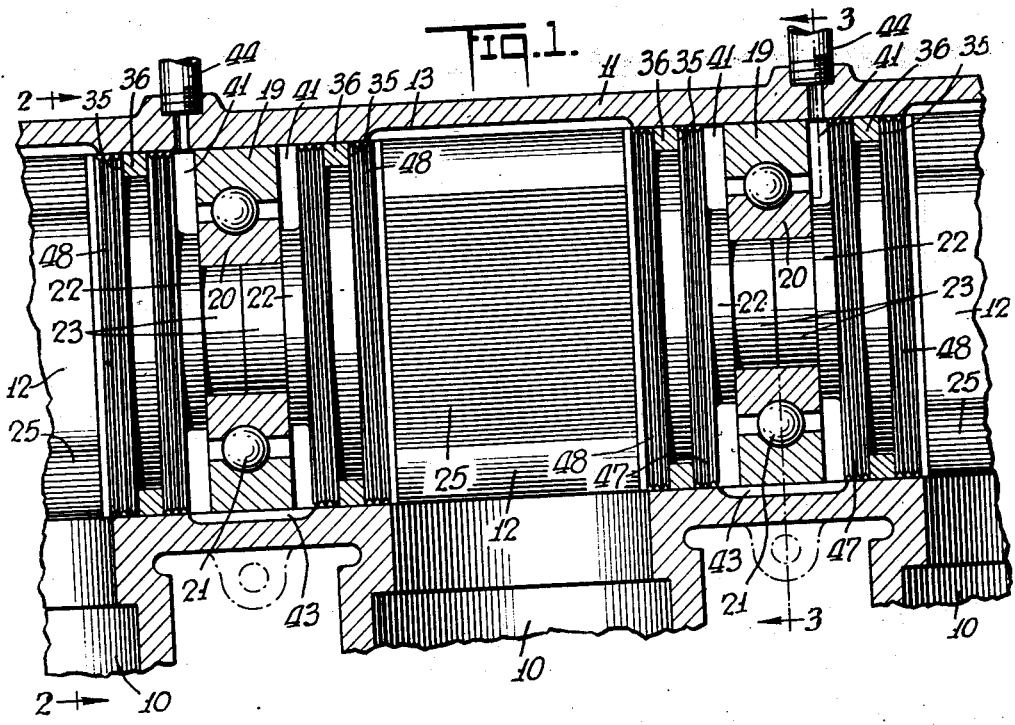
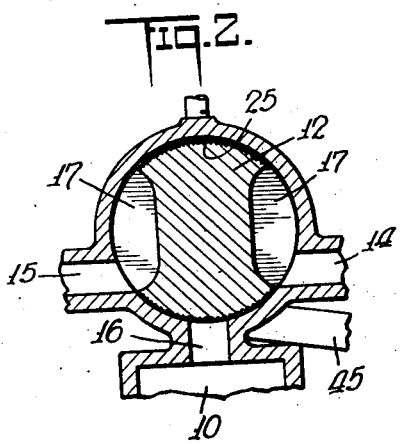
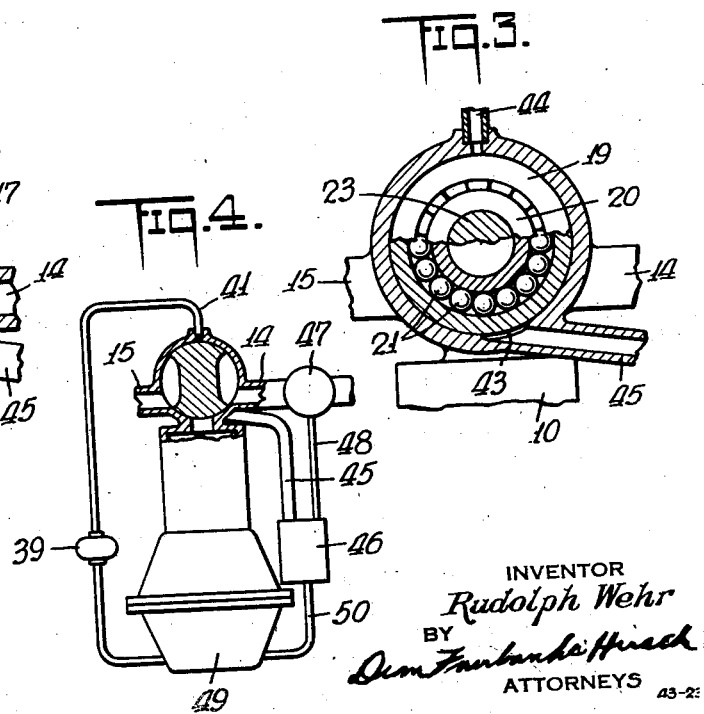
INVENTOR
Rudolph Wehr
BY
ATTORNEYS Patented Feb. 6, 1945

2,368,956

UNITED STATES PATENT OFFICE 2,368,956

ROTARY VALVE

Rudolph Wehr, New York, N. Y.

Original application October 12, 1940, Serial No. 360,863. Divided and this application February 6, 1943, Serial No. 474,941

14 Claims. (Cl. 123—190)

The present application is a division of my application Serial No. 360,863, filed October 12, 1940, now Patent No. 2,328,115, August 31, 1943.

The present invention relates to rotary valves for use in controlling the admission and discharge of gases to and from internal combustion engines, and more particularly to the lubrication of such valves.

One object of the present invention is to provide a new and improved means for effectively lubricating such valves, while preventing or reducing to a minimum the leakage of lubricating oil into the hot combustion gases in or emerging from the combustion chambers, thereby causing corresponding reduction in carbonization and smoking.

Various other objects of the invention will be apparent from the following particular description, and from an inspection of the accompanying drawing, in which Fig. 1 is a sectional view of a portion of an internal combustion engine provided with a valve mechanism having lubricating means embodying the present invention;

Figs. 2 and 3 are transverse sections taken on lines 2—2 and 3—3 respectively of Fig. 1, but on a smaller scale; and Fig. 4 is a diagrammatic showing of the oil circulating system.

In the form shown in the drawing, the engine has a series of combustion cylinders 10 provided with a cylinder head 11 constituting a valve casing, and having a bore 13 for housing a series of rotary valve members 12 in axial alignment. The valve housing is provided with an intake port 14, an exhaust port 15 and a cylinder port 16 for each cylinder. Each valve section 12 is provided with two symmetrically arranged recesses or passageways 17, adapted to connect the cylinder port 16 with the intake port 14 and exhaust port 15 in proper sequence upon rotation of the valve.

The pressure exerted by the gases in the cylinder during the compression and explosion of the gases tends to lift the rotor away from its seat at the cylinder port 16 and permits leakage past the valve, and the heating and expansion of the rotor might cause binding or fraction and wearing of the rotor and casing. To avoid this, each valve section 12 is supported at each end by suitable bearings. These are shown as anti-friction bearings each comprising an outer race 19, affixed at its outer periphery in the bore 13 of the housing 11, an inner race 20, and a series of bearing balls 21 between said races.

Each valve section 12 is provided at each end with a boss 22 abutting the end of the inner race 20, and a shaft or trunnion 23 of reduced diameter extending axially from said boss into the bore of said inner race. The opposed shafts 23 of adjoining rotors 12 are keyed or otherwise affixed together or to the inner races 20, so that all the valve sections are co-axially connected for rotation in unison. The rotation of these rotors may be effected in any manner well-known in the art.

In order to maintain the valve sections 12 and the housing 11 in proper gas-tight seating contact under varying conditions of heat and pressure, the seating section of one of said members may be serrated to form a series of V-shaped ridges 25 of small cross-section, extending transversely of the direction of relative movement of said members. Furthermore, the interior surface of the casing opposite to each cylinder port is cut away or made larger so that the valve sections do not contact therewith. This construction per se forms no part of the present application, and is fully disclosed and claimed in my aforesaid copending application.

To prevent leakage of lubricating oil or gas endwise of the valve, each of the rotors is provided near each end with a peripheral groove 35 to receive a split metal packing ring 36, of the piston ring type, expansible into sealing engagement with the peripheral wall of the housing 11.

For lubricating the valve mechanism, the ends of the rotors 12 are spaced from the corresponding ends of the bearings by the bosses 22 to form lubricant chambers 41 on opposite sides of each bearing, and the lower section of the housing 11 is recessed opposite each race ring 19 to provide a transverse groove or sump 43 interconnecting said chambers. Lubricating oil is introduced desirably under considerable pressure from a suitable pressure source such as a pump 39, into one or both of the chambers 41 through an inlet 44 at the top, and is exhausted from each sump 43 through a discharge pipe 45. As shown, the pipe 44 leads to only one of the chambers, but a groove across the top of the race ring 19 may be provided similar to the groove 43, and the pipe 44 lead directly to this groove.

Means are provided for creating a suction on the several lubricant discharge pipes which is approximately equal to that created in the fuel passages 17 during the suction stroke of the engine piston cylinder so as to substantially prevent oil from being drawn into said passages from the bearings and thus come into contact and be burned by the exhaust gases, and cause the engine to smoke. This suction may be created by various means such as a pump or a vacuum tank. As shown, diagrammatically in Fig. 4, the suction pipes 45 are connected to a vacuum tank 46 which may be connected to the intake manifold 47 by a pipe 48 and connected to the crank case 49 or other oil receiver by a pipe 50. If such vacuum tank be employed, it will be understood that it may be large enough to store the oil received therein, until the engine is stopped and the vacuum is lost, so that the oil may drain out by gravity, or the tank may be of the common float-controlled type once commonly used and into which gasoline was sucked from the supply tank and drained to the carburetor. As the partial vacuum in the intake manifold is substantially constant, the lubricant chambers will be maintained under substantially the same partial vacuum.

To permit oil to be fed to the packing rings 36 against the action of the vacuum around the bearings, and to prevent high pressure combustion gases from blowing into the chambers 41 and 42, each rotor 12 is formed or provided at each end between the chambers 41 and the adjoining packing rings with a circular section 47, formed on its periphery with fine shallow screw threads of comparatively small pitch. As an example, these may be equivalent to about 32 turns to the inch. The threads of the section 47 have a lead or direction which when the rotors 12 are rotated, effect screw feeding of the oil from the chambers 41 and 42 to the rings 36, to lubricate the latter. The lead of the threads on the rotor section 47 to produce the oil feeding effect noted depends on the direction of rotation of the rotors. If, for instance, the rotors 12 are driven in counterclockwise direction as viewed in Fig. 2, the right hand rotor section 47 of each rotor will have left hand threads, while the left hand rotor section 47 of said rotor will have right hand threads.

By providing a thread surface engagement between the rotor section 47 and the cylindrical wall of the rotor housing 11, the amount of friction between the contacting surfaces is reduced to a minimum, so that the amount of oil necessary to effectively lubricate these surfaces is correspondingly reduced. Furthermore, the provision of these threaded sections 47 eliminates the necessity of accurate machining as would be necessary if these sections 47 were cylindrical, and reduces the possibility of the rotors binding in their housing 11 when heated and expanded. Also, by providing threads, the surface contact and therefore wear between the sections 47 and the housing 11 is evenly distributed instead of being localized as would be the case if the ridges or teeth on the rotor sections 47 had no pitch.

To prevent leakage of oil past the packing rings 36 and into the cylinders 10, each rotor 12 is desirably provided on the side of each packing ring 36 opposite the threaded section 47 with a circular section 48 having fine shallow screw threads similar to those on the sections 47. They may have a lead or direction which tends to keep the oil which leaks past the packing rings 37 from flowing into the combustion chamber 10. For that purpose, the threads of each of the rotor sections 48 on one side of the packing ring 37 may be in a direction opposite to the lead or direction of the threads of the section 47 on the other side of said packing ring.

As pointed out in my application hereinbefore referred to, the serrations 25 on the valves retard and substantially prevent the flow of gases transversely to the direction of the serrations. In a similar way, the threads on the sections 47 and 48 are transverse to the direction of flow of gases lengthwise of the valve and substantially prevent the escape of gases into the chambers containing the bearings. Thus the vacuum maintained in said chambers may be substantially lower than that in the engine cylinders during the suction strokes of the pistons.

As many changes could be made in the above construction and many apparently widely different embodiments of the invention could be made without departing from the scope of the claims, it is intended that all matter contained in the above description or shown in the accompanying drawing shall be interpreted as illustrative and not in a limiting sense.

What is claimed is:

1. A rotary valve mechanism for internal combustion engines, comprising a rotary valve member, a housing having bearings therein for said member and a lubricant chamber communicating with one of said bearings, said chamber having an oil inlet and an oil outlet, and a circular member coaxially rigid with said valve member and disposed between said chamber and the valve seating section of said valve member and having outer peripheral threads engaging the inner wall of said housing, and means for substantially continuously maintaining said outlet under partial vacuum during operation of the engine.

2. A rotary valve mechanism for internal combustion engines, comprising a rotary valve member, a housing having bearings for said member and a lubricant chamber communicating with one of said bearings, said chamber having an oil inlet and an oil outlet and a circular member coaxially rigid with said valve member and disposed between said chamber and the valve seating section of said valve member, and having outer peripheral threads engaging the inner wall of said housing, and leading in a direction to screw feed lubricant from said chamber lengthwise of said valve member upon rotation of said latter member, and means for substantially continuously maintaining said outlet under partial vacuum during operation of the engine.

3. A rotary valve mechanism for internal combustion engines, comprising a rotor having a valve section, a housing having a bearing for said rotor, a metal packing ring between said bearing and said valve section, a circular member coaxially rigid with said rotor and disposed between said bearing and said ring, said member having peripheral threads engaging the inner wall of said housing and leading in a direction to screw feed lubricant from said chamber to said ring, and means for substantially continuously creating a partial vacuum around said bearing during operation of the engine to prevent oil from flowing therefrom to said valve section.

4. In a multi-cylinder internal combustion engine, a rotary valve mechanism comprising a plurality of axially arranged rotary valve members, one for each of the cylinders, a bearing between each pair of adjoining valve members for supporting said valve members, a housing for said valve members and said bearing, a lubricant chamber between each side of a bearing and the adjacent end face of an adjoining valve member, means for delivering lubricant to each pair of adjoining chambers, and means for maintaining a subatmospheric pressure in said chambers.

5. In an internal combustion engine, the combination of a rotary mechanism including a rotary valve member with a seating section adjacent the cylinder port to control flow of fluid to and from said port, a housing for said valve member, a bearing in said housing for said valve member, and a lubricant chamber in said housing having an inlet and an outlet, and having communication with said bearing, means for delivering lubricant oil to said inlet, and means for substantially continuously maintaining said outlet under partial vacuum during operation of the engine.

6. In an internal combustion engine, a rotary valve for controlling the admission and discharge of gas to and from the combustion cylinder comprising a housing, a rotor therein, a lubricant chamber in said housing bounded on one side by one end of said rotor, said rotor having a threaded end section adapted to screw feed lubricant from said chamber lengthwise of said rotor upon rotation of said rotor, and means for substantially continuously maintaining said chamber under subatmospheric pressure during operation of the engine.

7. In an internal combustion engine, a rotary valve for controlling the admission and discharge of gas to and from the combustion cylinder comprising a housing, a rotor therein, a lubricant chamber bounded on one side by one end of said rotor, and a split ring mounted in a peripheral groove of said rotor and expansible into contact with the peripheral wall of said housing, the end section of said rotor on one side of said lubricant chamber being peripherally threaded to screw feed lubricant from said chamber to said ring upon rotation of said rotor, and means for substantially continuously maintaining said chamber under subatmospheric pressure during operation of the engine.

8. In an internal combustion engine, a rotary valve for controlling the admission and discharge of gas to and from the combustion cylinder comprising a housing, a rotor therein, bearings in said housing for supporting said rotor, and spaced away from one end of said rotor and forming therewith a lubricant chamber, said housing having an inlet and an outlet to said chamber, a split metal ring mounted in a peripheral groove of said rotor, and expansible into contact with the peripheral wall of said housing, the end section of said rotor on one side of said lubricant chamber being peripherally threaded to screw feed lubricant from said chamber to said ring upon rotation of said rotor, and means for substantially continuously maintaining said chamber under partial vacuum during operation of the engine.

9. A rotary valve comprising a housing, a rotor therein and having a peripheral groove near one end thereof, a packing ring in said groove engaging the peripheral wall of said housing, the sections of said rotor on opposite sides of said ring being peripherally threaded, means for delivering lubricant to the threads the rotor section nearest the end, said latter threads having a lead which will effect screw feeding of the lubricant lengthwise of said rotor upon rotation of said rotor, and a lubricant outlet from said chamber and maintained under sub-atmospheric pressure.

10. A rotary valve mechanism comprising a housing, a pair of rotors in said housing, a bearing unit for said rotors disposed in said housing between said rotors and spaced from the adjoining ends of said rotors to form a pair of lubricant chambers on opposite sides of said bearing unit, means for delivering lubricant to said chambers, and means for substantially continuously creating a partial vacuum in said chambers during rotation of said mechanism.

11. A rotary valve mechanism comprising a housing, a pair of rotors in said housing, a bearing unit for said rotors disposed in said housing between said rotors and spaced from the adjoining ends of said rotors to form a pair of lubricant chambers on opposite sides of said bearing unit, means for delivering lubricant to said chambers, and suction means for substantially continuously withdrawing lubricant from said chambers during rotation of said mechanism.

12. A rotary valve mechanism comprising a housing, a pair of rotors in said housing, an anti-friction bearing unit for said rotors disposed in said housing between said rotors and spaced from the adjoining ends of said rotors to form a pair of lubricant chambers on opposite sides of said bearing unit, means for delivering lubricant to said chambers, said rotors having at the ends thereof adjacent said bearing unit peripherally threaded cylindrical sections, and means for maintaining a substantially constant subatmospheric pressure in said chambers.

13. A rotary valve mechanism comprising a housing a pair of rotors in said housing, an anti-friction bearing unit for said rotors disposed in said housing between said rotors, and spaced from the adjoining ends of said rotors to form a pair of lubricant chambers on opposite sides of said bearing unit, separate means for delivering lubricant to each of said chambers, each of said rotors having a peripheral groove near each end, a split packing ring in each of said grooves, the sections of each rotor on opposite sides of each of its grooves being peripherally threaded, and separate means for substantially continuously withdrawing lubricant from each of said chambers during rotation of said mechanism.

14. A rotary valve mechanism comprising a housing, a pair of rotors in said housing, an anti-friction bearing unit for said rotors disposed in said housing between said rotors, and spaced from the adjoining ends of said rotors to form a pair of lubricant chambers on opposite sides of said bearing unit, means for delivering lubricant to said chambers, each of said rotors having a peripheral groove near each end, a split packing ring in each of said grooves, the sections of each rotor on opposite sides of each of its grooves being peripherally threaded, and means for maintaining said chambers under subatmospheric pressure to retard flow of lubricant along said threaded portions.

RUDOLPH WEHR.